United States Patent [19]
Udd et al.

[11] Patent Number: 6,050,094
[45] Date of Patent: *Apr. 18, 2000

[54] SUPERCHARGED INTERNAL COMBUSTION ENGINE

[75] Inventors: Sören Udd, Nödinge; Magnus Dahlgren, Västra Frölunda, both of Sweden

[73] Assignee: AB Volvo, Gothenburg, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 09/142,907
[22] PCT Filed: Apr. 24, 1997
[86] PCT No.: PCT/SE97/00692
§ 371 Date: Sep. 18, 1998
§ 102(e) Date: Sep. 18, 1998
[87] PCT Pub. No.: WO97/40270
PCT Pub. Date: Oct. 30, 1997

[30] Foreign Application Priority Data

Apr. 25, 1996 [SE] Sweden ................................. 9601583

[51] Int. Cl.⁷ ............................. F02B 39/04; F02M 25/07
[52] U.S. Cl. ............................................ 60/605.2; 60/624

[58] Field of Search ..................................... 60/605.2, 607, 60/608, 624

[56] References Cited

U.S. PATENT DOCUMENTS

| | | | |
|---|---|---|---|
| 4,803,969 | 2/1989 | Hiereth et al. | 60/608 |
| 5,131,229 | 7/1992 | Kriegler et al. | 60/605.2 |
| 5,729,978 | 3/1998 | Hiereth et al. | 60/607 |

FOREIGN PATENT DOCUMENTS

| | | |
|---|---|---|
| 0 596 855 | 5/1994 | European Pat. Off. . |
| 33 39 592 | 10/1985 | Germany . |
| 1-116232 | 5/1989 | Japan . |

*Primary Examiner*—Michael Koczo
*Attorney, Agent, or Firm*—Young & Thompson

[57] ABSTRACT

A turbocharged internal combustion engine with exhaust return via a valve on the intake side of the turbocompressor unit to the engine intake side. The turbine and the compressor of the turbocompressor unit are adapted to each other and to the engine in such a way that the pressure on the inlet side of the turbine is always higher than the pressure on the pressure side of the compressor. The rotary shaft of the unit is coupled via a drive chain containing a continuously variable transmission to the crank shaft of the engine. An electronic control unit controls the transmission ratio and the degree of opening of the valve.

6 Claims, 1 Drawing Sheet

U.S. Patent     Apr. 18, 2000     6,050,094
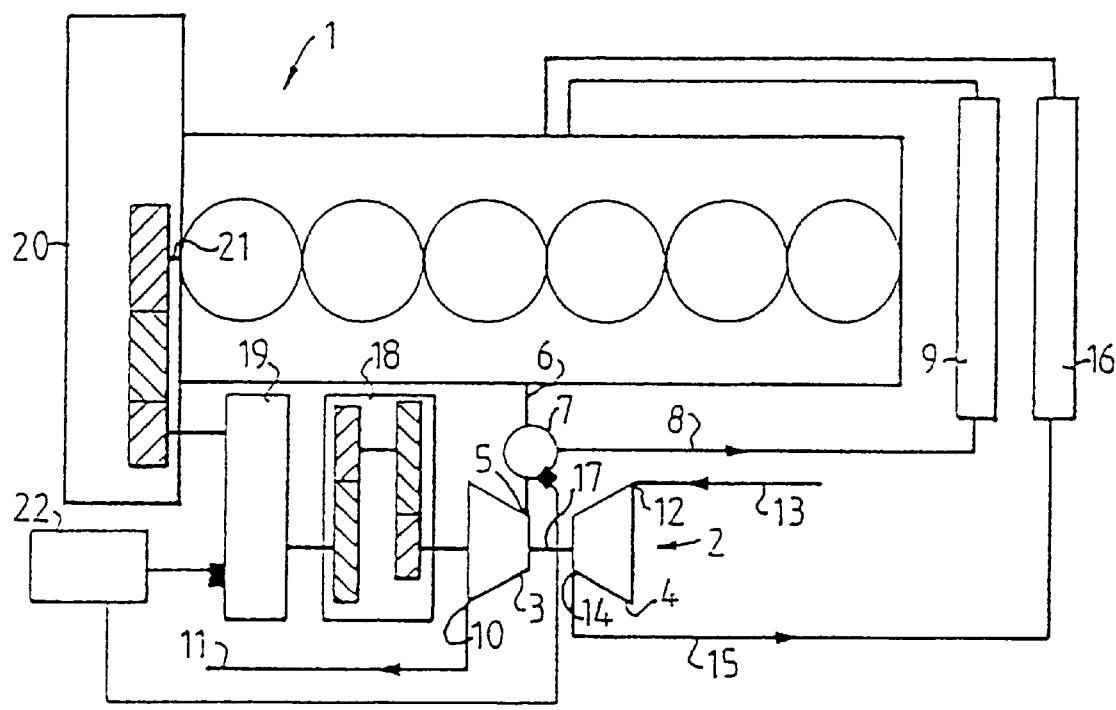

SUPERCHARGED INTERNAL COMBUSTION ENGINE

BACKGROUND OF THE INVENTION

The present invention relates to a supercharged internal combustion engine comprising firstly a turbocompressor unit with an exhaust driven turbo unit, which has an inlet communicating with the exhaust side of the engine, and a compressor unit, which has a suction side communicating with the surrounding atmosphere and a pressure side communicating with the engine intake side, and secondly an exhaust recirculation valve coupled between the exhaust side of the engine and the inlet of the turbo unit, said valve being settable for recirculation of a certain portion of the exhaust to the engine intake side.

DESCRIPTION OF THE RELATED ART

Exhaust can be returned to the intake side of a supercharged engine in essentially two different ways, each having different advantages and disadvantages, namely before or after the compressor. The simplest method technically would be to connect the recirculation line to the suction side of the compressor, but in that case the exhaust must pass through the compressor and then through the charge air cooler which is usually present. A significant disadvantage of this is however, that all the components would in time become coated with harmful soot from the exhaust. This disadvantage can be avoided by introducing the exhaust downstream of said components but if a turbo unit is used with the desired high efficiency, the charge air pressure will be higher than the exhaust pressure within the normal operating rpm range of the engine, which means that some form of pump device is desired which increases the exhaust pressure to a level above the charge air pressure. A supercharged engine with an exhaust pump in the form of an ejector pump is known by SE-A-9301093-2.

SUMMARY OF THE INVENTION

The purpose of the present invention is in general to achieve a supercharged internal combustion engine of the type described by way of introduction which permits return of exhaust to the intake side downstream of the compressor without requiring an exhaust pump. This is achieved according to the invention by virtue of the fact that the turbo unit and the compressor unit are so adapted to each other and to the engine that, within the normal operating speed range of the engine, the exhaust pressure on the inlet side of the turbo unit is higher than the charge air pressure on the pressure side of the compressor unit.

As regards design, this can be achieved with a turbocompressor which is dimensioned so that the pressure fall over the turbine will be greater than normal. A certain loss of efficiency in the turbo unit is in this case unavoidable.

In a preferred further development of the engine according to the invention, the turbo unit is coupled to the engine crank shaft via a reduction gearing and a continuously variable transmission. The loss which arises when redistributing the pressures can thus be recovered so that final result will be a net gain despite the increase in the exhaust pressure on the intake side of the turbo unit. An engine with these characteristic features thus fulfills three important conditions. By combining the setting of the degree of opening of the valve towards the engine intake side with a suitable setting of the rpm of the compressor with the aid of the continuously variable transmission, both the exhaust percent and the amount of air on the intake side can be freely controlled at each point on the operational curve of the engine at the same time as the compound arrangement permits exhaust return without any loss of efficiency.

BRIEF DESCRIPTION OF THE DRAWING

The invention will be described in more detail below with reference to examples shown in the accompanying drawing where the FIGURE shows schematically one embodiment of an engine installation with a six cylinder internal combustion engine.

DESCRIPTION OF THE PREFERRED EMBODIMENTS

The engine 1 in the FIGURE can be a four stroke diesel engine. It shows a turbocompressor unit, generally designated 2, which comprises a turbo unit 3 and a compressor unit 4. The turbo unit 3 is connected on its suction side 5 to an exhaust conduit 6 including an adjustable three way exhaust return valve 7, to which an exhaust conduit 8 is also connected. The conduit 8 is connected via an exhaust cooler 9 to the engine intake manifold (not shown). The outlet 10 from the turbo unit is connected to an exhaust pipe 11. The compressor 4 is connected on its inlet side 12 via a conduit 13 to an intake filter (not shown) and on its outlet side 14 via a conduit 15 to a charge air cooler 16 to the engine intake manifold. As can be seen from the FIGURE the conduit 8 is connected to the engine charge air side downstream of the charge air cooler 16 which, in addition to avoiding soot deposit in the cooler, is advantageous as regards function due to the fact that there is a pressure drop over the cooler.

The turbocompressor unit 2 has a rotary shaft 17, which is coupled, via a high speed gearing 18, a continuously variable transmission (CVT) 19 and a low speed gearing 20, to the engine crank shaft 21. In the component chain from the rotary shaft 17 to the crank shaft 21 there can be included a clutch and/or torsion damper, by means of which the driving connection between the rotary shaft 17 and the crank shaft 21 can be broken. In the high speed gearing IS a first rpm reduction is provided from the operating rpm of the turbo unit of approximately 100,000 rpm down to the CVT operating rpm of about 10,000 rpm. In the low speed gearing 20, the rpm is reduced further to the operating rpm of the crank shaft of about 2,000 rpm.

The transmission ratio in the CVT 19 and the degree of opening of the valve 7 towards the conduit 8 is controlled by an electronic control unit 22, which contains a microprocessor, in which the amount of returned exhaust and the amount of air is programmed for each operational point within the normal operational speed range of the engine, which can be expressed simply as being the rpm range from maximum engine torque to maximum engine power. The turbo unit 3 and the compressor unit 4 are furthermore dimensioned relative to each other and to the engine so that the pressure in the exhaust conduit 6 is always higher than the pressure in the charge air conduit 15 within the normal engine operating range. The smaller the pressure difference is, the more the valve 7 must be open towards the conduit 8 to provide a given amount of exhaust. The amount of air is controlled by the compressor rpm, which is regulated by the CVT. The control unit 22, which controls this, can be the electronic control unit which is present in most modem engines and which controls all engine functions as a function of vehicle engine data fed into the control unit from sensors known per se and not shown in more detail here.

The invention has been described above with reference to a preferred embodiment which has a transmission with a continuously variable transmission ratio, i.e. of the type which is usually called CVT. Within the scope of the invention there can be also be used fixed gear transmissions in which the transmission ratio can be varied in steps, or hydraulic transmissions, electrical transmissions or other types of transmissions with variable transmission ratios.

We claim:

1. Supercharged internal combustion engine, comprising:
   a turbocompressor unit with an exhaust driven turbo unit, said turbo unit having an inlet communicating with the exhaust side of the engine, and a compressor unit, said compressor unit having a suction side communicating with the surrounding atmosphere and a pressure side communicating with the engine intake side;
   an exhaust recirculation valve coupled between the exhaust side of the engine and the inlet of the turbo unit, said exhaust recirculation valve being settable for recirculation of a certain portion of the exhaust to the engine intake side;
   a transmission, with a variable transmission ratio, coupling the turbo unit to an engine crank shaft,
   the turbo unit and the compressor being coupled via a rotary shaft,
   the turbo unit being coupled to the crankshaft of the engine; and
   a control unit for controlling the transmission ratio to limit an energy transfer direction from the turbo unit gas to the crankshaft
   wherein, within the normal operating speed range of the engine, the exhaust pressure on the inlet side of the turbo unit is higher than the charge air pressure on the pressure side of the compressor unit.

2. Internal combustion engine according to claim 1, wherein the turbo unit is coupled to the crank shaft of the engine via a reduction gearing.

3. Internal combustion engine according to claim 1, wherein the transmission has a continuously variable transmission ratio.

4. Internal combustion engine according to claim 1, wherein the compressor unit communicates with the intake side of the engine via a charge air cooler and that the valve communicates with the engine intake side downstream of the charge air cooler.

5. Internal combustion engine according to claim 1, wherein the valve communicates with the engine intake side via an exhaust gas cooler.

6. Internal combustion engine according to claim 2, wherein the valve and the transmission with variable transmission ratio are controlled relative to each other by an electronic control unit.

\* \* \* \* \*